United States Patent
Sullivan (10) Patent No.: US 8,470,152 B2
(45) Date of Patent: Jun. 25, 2013

(54) METHOD OF OPERATING A CAPACITIVE DEIONIZATION CELL USING GENTLE CHARGE

(75) Inventor: James P. Sullivan, Lincoln University, PA (US)

(73) Assignee: Voltea B.V., Sassenheim (NL)

( * ) Notice: Subject to any disclaimer, the term of this patent is extended or adjusted under 35 U.S.C. 154(b) by 505 days.

(21) Appl. No.: 12/557,554

(22) Filed: Sep. 11, 2009

(65) Prior Publication Data

US 2010/0065438 A1 Mar. 18, 2010

Related U.S. Application Data

(60) Provisional application No. 61/096,901, filed on Sep. 15, 2008.

(51) Int. Cl.
*C02F 1/469* (2006.01)
*C25B 9/10* (2006.01)

(52) U.S. Cl.
USPC .................. 204/554; 204/520; 210/748.01

(58) Field of Classification Search
USPC ............... 204/252, 520, 554; 205/748, 758; 210/748.01
See application file for complete search history.

(56) References Cited

U.S. PATENT DOCUMENTS

| | | | |
|---|---|---|---|
| 5,192,432 A | 3/1993 | Andelman | |
| 5,196,115 A | 3/1993 | Andelman | |
| 5,200,068 A | 4/1993 | Andelman | |
| 5,360,540 A | 11/1994 | Andelman | |
| 5,415,768 A | 5/1995 | Andelman | |
| 5,425,858 A | 6/1995 | Farmer | |
| 5,538,611 A | 7/1996 | Otowa | |
| 5,547,581 A | 8/1996 | Andelman | |
| 5,620,597 A | 4/1997 | Andelman | |
| 5,748,437 A | 5/1998 | Andelman | |
| 5,779,891 A | 7/1998 | Andelman | |
| 5,788,826 A | 8/1998 | Nyberg | |
| 5,954,937 A | 9/1999 | Farmer | |
| 5,980,718 A | 11/1999 | Van Konynenburg et al. | |
| 6,022,436 A | 2/2000 | Koslow et al. | |
| 6,127,474 A | 10/2000 | Andelman | |
| 6,309,532 B1 | 10/2001 | Tran et al. ..................... 205/687 |
| 6,325,907 B1 | 12/2001 | Andelman | |
| 6,346,187 B1 | 2/2002 | Tran et al. | |
| 6,413,409 B1 | 7/2002 | Otowa et al. | |
| 6,416,645 B1 | 7/2002 | Sampson et al. | |
| 6,462,935 B1 | 10/2002 | Shiue et al. | |
| 6,482,304 B1 | 11/2002 | Emery et al. | |

(Continued)

FOREIGN PATENT DOCUMENTS

CN 1788831 6/2006
WO WO2008/094367 8/2008

OTHER PUBLICATIONS

JB Lee, KK Park, HM Eum, CW Lee. "Desalination of a thermal power plant wastewater by membrane capacitive deionization." Desalination. Sep. 5, 2006. vol. 196. pp. 125-134.*

(Continued)

*Primary Examiner* — Keith Hendricks
*Assistant Examiner* — Steven A. Friday
(74) *Attorney, Agent, or Firm* — Pillsbury Winthrop Shaw Pittman LLP (57) ABSTRACT

A method of operating a capacitive deionization cell using charge potentials of 1 V or less.

10 Claims, 8 Drawing Sheets

Cross sectional view of an assembled CDI test cell before compression.

U.S. PATENT DOCUMENTS

| | | | |
|---|---|---|---|
| 6,569,298 B2 | 5/2003 | Merida-Donis | |
| 6,580,598 B2 | 6/2003 | Shiue et al. | |
| 6,628,505 B1 | 9/2003 | Andelman | |
| 6,661,643 B2 | 12/2003 | Shiue et al. | |
| 6,709,560 B2 | 3/2004 | Andelman et al. | |
| 6,778,378 B1 | 8/2004 | Andelman | |
| 6,781,817 B2 | 8/2004 | Andelman | |
| 6,798,639 B2 | 9/2004 | Faris et al. | |
| 6,805,776 B2 | 10/2004 | Faris | |
| 8,038,867 B2 * | 10/2011 | Du et al. | 205/744 |
| 2002/0084188 A1 | 7/2002 | Tran et al. | |
| 2002/0154469 A1 | 10/2002 | Shiue et al. | |
| 2002/0167782 A1 | 11/2002 | Andelman et al. | 361/302 |
| 2003/0029718 A1 | 2/2003 | Faris | |
| 2003/0063430 A1 | 4/2003 | Shiue et al. | |
| 2003/0098266 A1 | 5/2003 | Shiue et al. | 210/87 |
| 2003/0189005 A1 | 10/2003 | Inoue et al. | |
| 2004/0012913 A1 | 1/2004 | Andelman | |
| 2004/0013918 A1 | 1/2004 | Merida-Donis | |
| 2004/0038090 A1 | 2/2004 | Faris | 429/12 |
| 2004/0095706 A1 | 5/2004 | Faris et al. | 361/303 |
| 2004/0188246 A1 | 9/2004 | Tran et al. | 204/267 |
| 2005/0079409 A1 | 4/2005 | Andelman et al. | |
| 2005/0103634 A1 | 5/2005 | Andelman et al. | |
| 2006/0144765 A1 | 7/2006 | Skwiot | 210/85 |
| 2007/0144898 A1 | 6/2007 | Oldani et al. | 204/286.1 |
| 2007/0158185 A1 | 7/2007 | Andelman et al. | |
| 2007/0284313 A1 | 12/2007 | Lee et al. | 210/746 |
| 2008/0144256 A1 | 6/2008 | Cai et al. | 361/502 |
| 2010/0065439 A1 | 3/2010 | Sullivan et al. | 205/748 |
| 2010/0065511 A1 | 3/2010 | Knapp et al. | 210/748.01 |
| 2010/0230277 A1 | 9/2010 | Sullivan et al. | 204/633 |

OTHER PUBLICATIONS

Blair, JW; Murphy GW, "Electrochemical Demineralization of Water with Porous Electrodes of Large Surface Area", Symposium on Saline Water Conversion, National Academy of Sciences, National Research Council Publication 568, 1957; p. 196.

Blair, GW; Murphy, GW; "Non-Equilibrium Thermodynamics of Transference Cells, Cells Without Transference, and Membrane Demineralization Processes", Advances Chemistry Series 1960, vol. 27, p. 206.

Murphy GW ; "Electrochemical Desalting of Water with Electrodes of Large Surface Area"; DeChema-Monographien, . Proceedings of the European Symposium "Fresh Water from the Sea", European Federation of Chemical Engineers, Athens May 31-Jun. 4, 1962;Verlag Chemie GMBH, Weinheim/Bergstrasse, 1962, vol. 47, No. 781-834, p. 639.

Murphy GW, Blomfield JJ, Smith FW, Neptune WE, Purdue JO, Candle D, Stevens AL, Tucker J, North Wood E, Tague L, Lawson M, Rose R and James D; "Demineralization of saline water by electrically-induced adsorption on porous carbon electrodes" ; Saline Water Conversion R&D Progr. Rept #92, PB181589, Office of Saline Water, US Dept. of the Interior, Mar. 1964.

Murphy GW, Blomfield JJ, Smith FW, Neptune WE, Candle D, Stevens AL, Tucker J, North Wood E, Tague L, Arnold BB, Blair ;JW and Satter A..; "Demineralization of saline water by electrically-induced adsorption on porous carbon electrodes"; Saline Water Conversion R&D Progr. Rept #93, PB181590, Office of Saline Water, US Dept. of the Interior, Mar. 1964.

Murphy GW, Hock R, Caudle D, Papastamataki A, Tucker JH, and Wood EN; "Electrochemical demineralization of water with carbon electrodes"; Saline Water Conversion R&D Progr. Rept #140, Office of Saline Water, US Dept. of the Interior 1965.

Caudle DD, Tucker JH, Cooper JL, Arnold BB, Papastamataki A, Wood EN, Hock R and Murphy GW; "Electrochemical demineralization of water with carbon electrodes"; Saline Water Conversion R&D Progr. Rept #188, Office of Saline Water, US Dept. of the Interior 1966.

Murphy, GW; Caudle, DD; "Mathematical theory of electrochemical demineralization in flowing systems"; Electrochimica Acta 1967, vol. 12, p. 1655.

Murphy GW and Cooper JL; "Activated carbon used as electrodes in electrochemical demineralization of saline water"; Saline Water R&D Conversion Progr. Rept #399, Office of Saline Water, US Dept. of the Interior 1968.

Johnson, A. M., Newman, J.; "Desalting by Means of Porous Carbon Electrodes"; Journal of the Electrochemical Society; 1971, vol. 130, p. 510.

Oren, Y., Soffer, A.; "Water Desalting by Means of Electrochemical Parametric Pumping. 1. The Equilbrium Properties of a Batch Unit-Cell"; Journal of Applied Electrochemistry, 1983. vol. 13, p. 473-487.

Oren, Y., Soffer, A.; "Water Desalting by Means of Electrochemical Parametric Pumping. 2. Separation Properties of a Multistage Column"; Journal of Applied Electrochemistry 1983, vol. 13, pp. 489-605.

Ganzi, G.C., Wood, J.H., and Griffin, C. S.; "Water-purification and Recycling Using the CDI Process"; Environmental Progress, 1992, vol. 11, pp. 49-53.

University of Oklahoma Research Institute, Norman; "Demineralization of saline water by electrically-induced adsorption on porous graphite electrodes"; Saline Water R&D Conversion Progr. Rept #45, Office of Saline Water, US Dept. of the Interior, 1960.

Departments of Chemistry, University of Oklahoma and Normal Oklahoma Baptist University Shawnee; "Demineralization of Saline Water by Electrically-Induced Adsorption on Porous Carbon Electrodes"; Saline Water Conversion R&D Progr. Rept #58, Office of Saline Water, US Dept. of the Interior, 1962.

Farmer, J. C., Fix, D. V., Mack, G. V., Pekala, R. W., & Poco, J. F. 1195, "Capacitive deionization of water: An innovative new process", in Proceedings of the 1995 5th International Conference on Radioactive Waste Management and Environmental Remediation. Part 2 (of 2), Sep. 3-7, 1995, A SME, New York, NY, USA, Berlin, Ger, pp. 1215-1220.

Farmer, J. C., Fix, D. V., Mack, G. V., Pekala, R. W., & Poco, J. F. "Capacitive deionization with carbon aerogel electrodes: carbonate, sulfate, and phosphate", pp. 294-304.

Farmer, J. C., Fix, D. V., Mack, G. V., Pekala, R. W., & Poco, J. F. 1996, "Capacitive Deionization of Na Cl and Na NO[sub 3] Solutions with Carbon Aerogel Electrodes", Journal of the Electrochemical Society, vol. 143, No. 1, pp. 159-169.

International Search Report PCT/US2009/005114.

International Search Reports of similar cases. PCT/US2009/005115; PCT/US2009/005106; PCT/US2009/005113.

TJ Welgemoed, CF Schutte. "Capacitive Deionization Techonology™: An alternative desalination solution." Desalination, vol. 183, pp. 327-340. (2005).

* cited by examiner

FIG. 1
Exploded view of the materials used for CDI testing.

FIG. 2a

Cross sectional view of an assembled CDI test cell before compression.

FIG. 2b

Cross sectional view of an assembled CDI test cell after compression.

FIG. 3

Schematic of the test apparatus used for CDI testing.

FIG. 4

Example test cycle illustrating TDS variation during the cycle.

FIG. 5
Cross section of the CDI test cell showing the location of the reference electrode, (70)

FIG. 6

Illustration of Ion Capacity—defined as the integrated area between the incoming TDS and the measured TDS at the outlet of the cell.

METHOD OF OPERATING A CAPACITIVE DEIONIZATION CELL USING GENTLE CHARGE

CROSS REFERENCE TO RELATED APPLICATION

This application claims the benefit of commonly owned and co-pending U.S. Provisional Application No. 61/096,901 filed on Sep. 15, 2008.

BACKGROUND OF THE INVENTION

Capacitive deionization (CDI) cells are known for purifying or otherwise deionizing liquids such as water. For example, U.S. Pat. No. 5,954,937 discloses an electrically regeneratable electrochemical cell for capacitive deionization and electrochemical purification and regeneration of electrodes including two end plates, one at each end of the cell. Two end electrodes are arranged one at each end of the cell, adjacent to the end plates. An insulator layer is interposed between each end plate and the adjacent end electrode. Each end electrode includes a single sheet of conductive material having a high specific surface area and sorption capacity. In one embodiment of this disclosure, the sheet of conductive material is formed of carbon aerogel composite. The cell further includes a plurality of generally identical double-sided intermediate electrodes that are equidistally separated from each other, between the two end electrodes. As the electrolyte enters the cell, it flows through a continuous open serpentine channel defined by the electrodes, substantially parallel to the surfaces of the electrodes. By polarizing the cell, ions are removed from the electrolyte and are held in the electric double layers formed at the carbon aerogel surfaces of the electrodes. As the cell is saturated with the removed ions, the cell is regenerated electrically, thus minimizing secondary wastes.

U.S. Pat. No. 6,709,560 discloses flow-through capacitors that are provided with one or more charge barrier layers. Ions trapped in the pore volume of flow-through capacitors cause inefficiencies as these ions are expelled during the charge cycle into the purification path. A charge barrier layer holds these pore volume ions to one side of a desired flow stream, thereby increasing the efficiency with which the flow-through capacitor purifies or concentrates ions.

These references all produce useful CDI cells, but a CDI cell that performs better is still needed. The desirable CDI cell has a large capacitance to remove ions from a liquid stream, and is durable enough to be able to run over a longer period of time, has reduced scale buildup on the components such as the spacer, and a flatter pH curve.

As used herein, "effective capacitance" means $dQ/dV$ for a membrane-electrode conjugate as determined by current interrupt as described herein.

Also as used herein, "durability" means hours until ion removal is less than 60% (under test conditions specified herein).

SUMMARY OF THE INVENTION

The present invention provides a method for durably softening water comprising:

(a) Assembling a cell comprising a cathode current collector, a first electrode capable of absorbing ions, a cation selective membrane, a spacer, an ion selective membrane, a second electrode capable of adsorbing ions, and an anode current collector;

(b) Collecting of a stream of clean water at a flow rate of F1, while applying a charge voltage of between about 0.5V and about 1.0V between said cathode current collector and said anode current collector for a first period of time, T1;

(c) Collecting a stream of waste water at a second flow rate, F2, while applying a discharge voltage between about −1.5 and about −1.0 V between said cathode current collector and said anode current collector for a second period of time, T2, such that $(T1)(F1)/[(T1)(F1)+(T2)(F2)]$ is greater than or equal to about 0.5, preferably about 0.6, and most preferably about 0.7.

In another aspect, the invention provides a method for durably softening a water stream that has a pH of less than about 8 comprising:

(1) Assembling a cell comprising a cathode current collector, a first electrode capable of absorbing ions, a cation selective membrane, a spacer, an ion selective membrane, a second electrode capable of adsorbing ions, and an anode current collector;

(2) Collecting of a stream of clean water at a flow rate of F1, while applying a charge voltage of between about 0.5V and about 1.0V between said cathode current collector and said anode current collector for a first period of time, T1

(3) Collecting a stream of waste water at a second flow rate, F2, while applying a discharge voltage between about −1.5 and about −1.0 V between said cathode current collector and said anode current collector for a second period of time, T2, such that the pH is maintained below a value of about 8.5, preferably about 8.0.

DETAILED DESCRIPTION OF THE INVENTION

Applicants have discovered that using a gentle charge potential during the charge (as opposed to discharge) cycle of operation of a CDI cell provides significantly improved performance. Specifically, operating the cell using a charge potential of less than or equal to 1 V provides the cell with more consistent performance, a flatter pH curve, and significantly lower spacer scale buildup.

Figure 1:
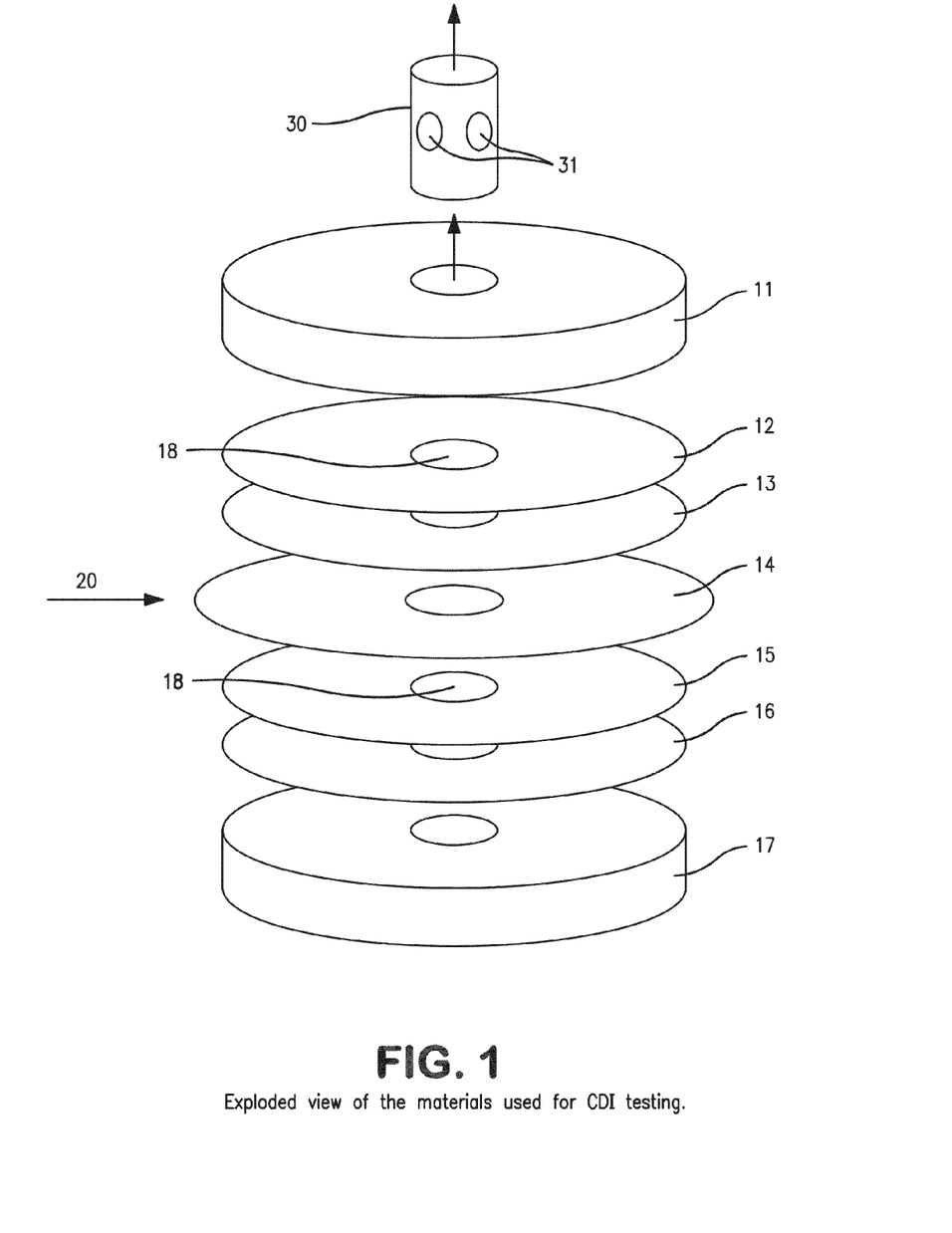
FIG. 1 is an exploded view of an exemplary embodiment of the invention.

An exploded view of the inside of a CDI cell according to an exemplary embodiment of the present invention is illustrated schematically in FIG. 1. The cell consists of a stack of discs, consisting in order, of an anion electrode, 12, an anion selective membrane, 13, a woven spacer, 14, that serves as a fluid flow path, a cation selective membrane, 15, and a cation electrode, 16. The stack of materials is compressed between two conductive graphite carbon blocks (POCO Graphite, Inc.), 11 and 17, which serve as electrical contacts to the electrodes. During the charging, or purification cycle, the anion electrode contacting graphite carbon block, 11, is electrically connected to the positive terminal of the power supply. The cation electrode contacting graphite carbon block, 17 is connected to the negative terminal of the power supply. A plurality of such cells may be used, in series or in parallel, in alternative embodiments of the invention.

The anion and cation electrodes, (12) and (16) are cut from sheets, composed of activated carbon, conductive carbon black and a PTFE binder. Electrodes of this type are widely used in electric double layer capacitors. In these tests, electrodes of varying thickness were obtained from Japan Gore-Tex, Inc., Okayama, Japan. The dimensions of the electrodes in the cell of this embodiment are 3" in diameter, and have a 0.5" diameter hole (18) in the center to allow the treated water to pass out of the cell.

The anion membrane (13) is cut from sheets of NEOSEPTA AM1 (Amerida/ASTOM). The dimensions are 3" OD with a 0.5" ID. The cation membrane (15) is cut from sheets of NEOSEPTA CM1 (Amerida/ASTOM). The spacer, 14, is a 3.25" OD×0.5" ID disc cut from a 0.004" woven polyester screen.

The flow of water into the cell is radial, with water entering the cell from the outside edge of the spacer, (14), and flowing out the center exit tube, (30). Holes (31) are positioned in the center exit tube to enable water to flow from the spacer into the tube.

Figure 2A:
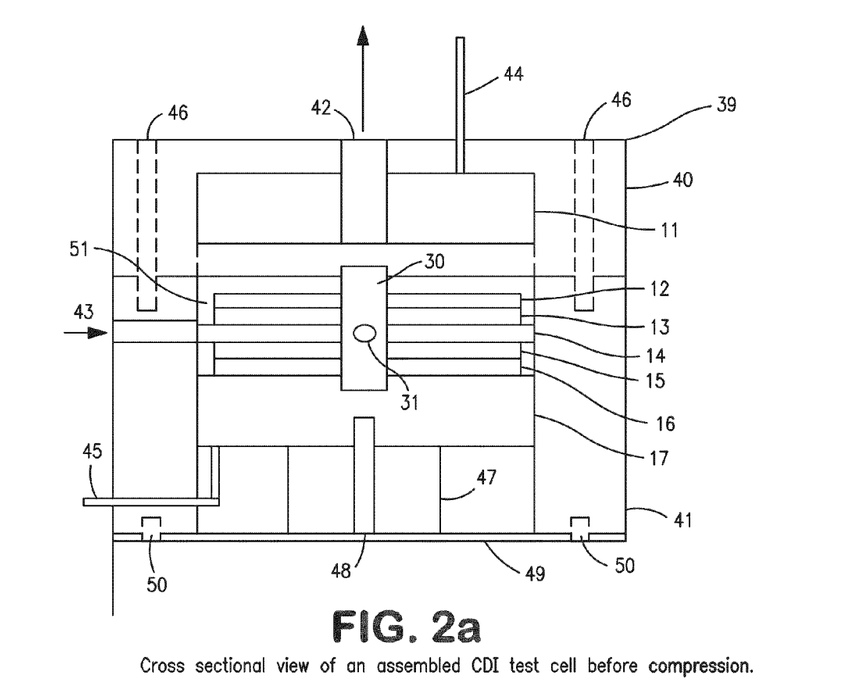
FIG. 2a is a cross sectional view of an assembled CDI cell according to an exemplary embodiment of the invention before compression.
Figure 2B:
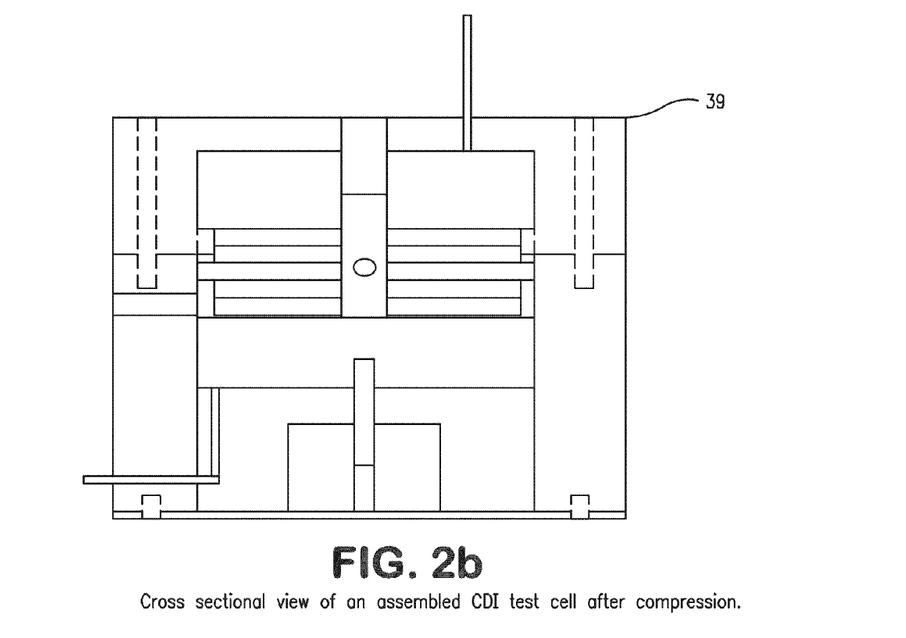
FIG. 2b is a cross sectional view of an assembled CDI cell according to an exemplary embodiment of the invention after compression.

A cross section of exemplary cell components as assembled in an exemplary cylindrical cell housing, (39), are shown in FIG. 2a. The housing consists of a top half (40) and a bottom half (41), joined by means of 4 bolts (46). The cation contacting graphite carbon block, (17) is mounted to a pneumatically actuated air cylinder (47). The cell components, 12-16 are stacked on top of the carbon block (17), and around the exit tube (30). The anion contacting carbon block (11), is rigidly mounted to the top half to the housing (40). Electrical leads 44 and 45 connect the anion contacting carbon block (11) and the cation contacting carbon block (17) to the power supply. Water is brought into the cell through the water inlet (43) and fills the circular cavity (51) surrounding the cell components (12-16). The water flows radially through the spacer (14) and exits the cell via holes (31) in the exit tube (30) and the cell water outlet (42). The pneumatic cylinder is mounted to a base (49), which is attached to the bottom half of the housing (41) by means of bolts (50). The air cylinder piston (48) is mounted to the cation contacting carbon block 17. When the air cylinder is activated the air cylinder piston is extended from the air cylinder, raising (17) and compressing the cell assembly as shown in FIG. 2b.

Figure 3:
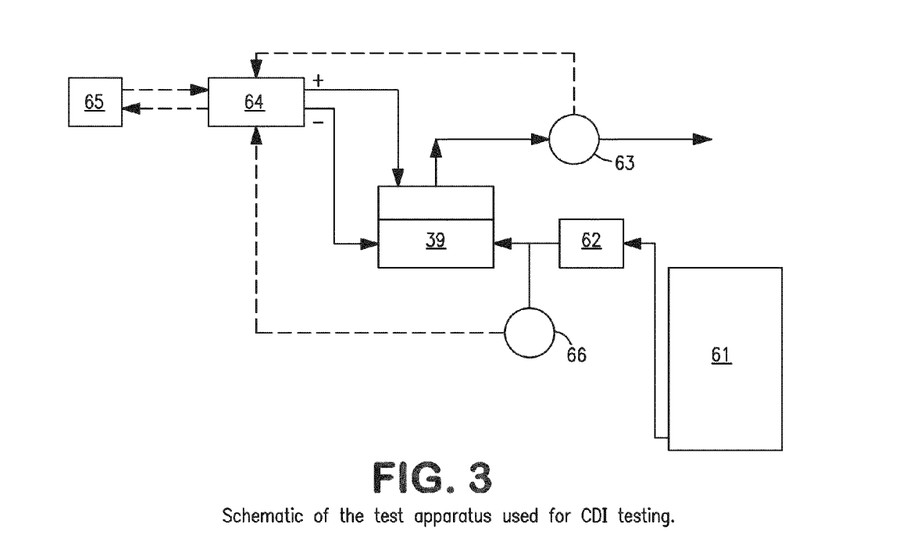
FIG. 3 is a schematic of the test apparatus used for CDI testing.

In operation of this exemplary embodiment, as shown in FIG. 3, water is pumped from a reservoir, (61), via a peristaltic pump (62) into the cell (39). Treated water is analyzed with a conductivity probe (63). The output of the conductivity probe is converted to total dissolved solids (TDS), based on a NaCl calibration. Power is applied to the cell by means of an programmable battery cycle tester (64) (ARBIN BT2000). Potential, current and conductivity are recorded as a function of time on a computer (65). The inlet pressure to the cell is monitored by an inlet pressure transducer (66), whose output can optionally be included in the ARBIN (64).

Figure 4:
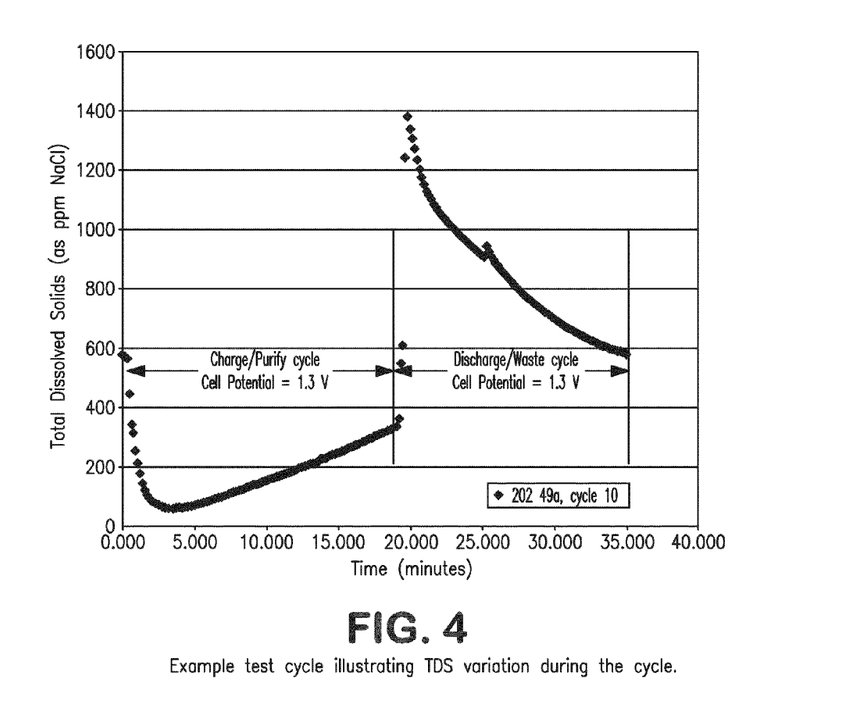
FIG. 4 is a graph of an Example test cycle illustrating TDS variation during the cycle.

The cell TDS can be utilized as a set point by the battery cycle tester in the controlling charge and discharge cycles. Inlet water TDS is nominally 480 ppm. At the beginning of the charge cycle, the TDS rapidly declines to some minimum value (see FIG. 4). After reaching the minimum value, TDS increases slowly. Typically charge cycles are conducted until the product TDS reaches 320 ppm, at which point the polarity of the potential is reversed, causing the cell to discharge. There is a rapid increase in current and TDS on discharge. After reaching a peak, the TDS decreases and the discharge is typically allowed to proceed until the product TDS falls to 580 ppm.

EXAMPLES

Figure 5:
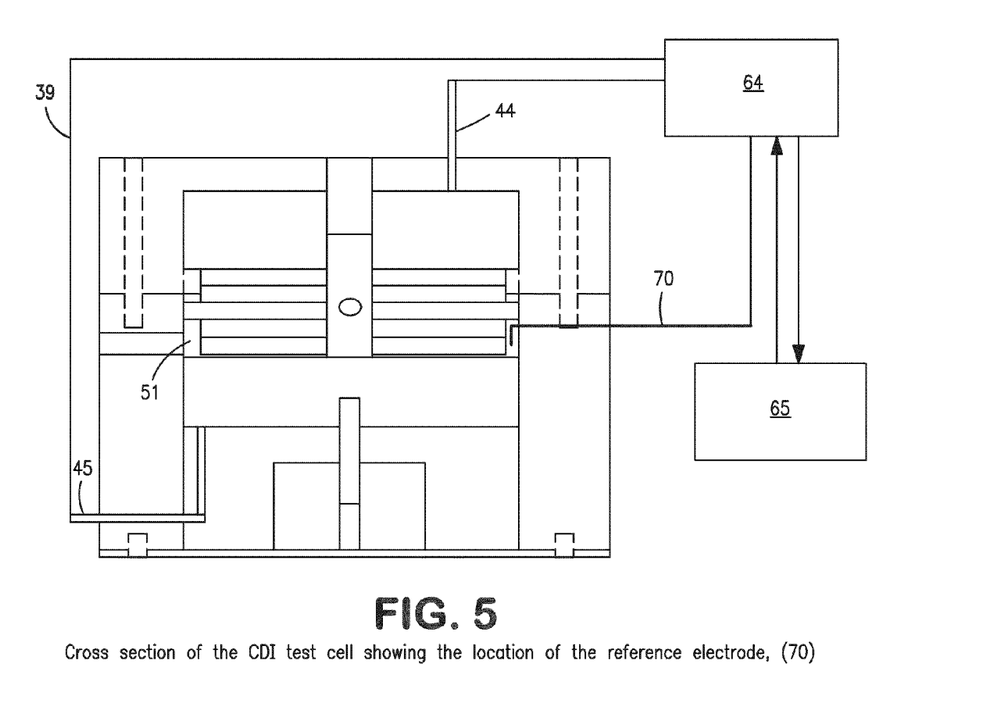
FIG. 5 is a cross section of an exemplary CDI test cell showing the location of the reference electrode, (70).
Figure 6:
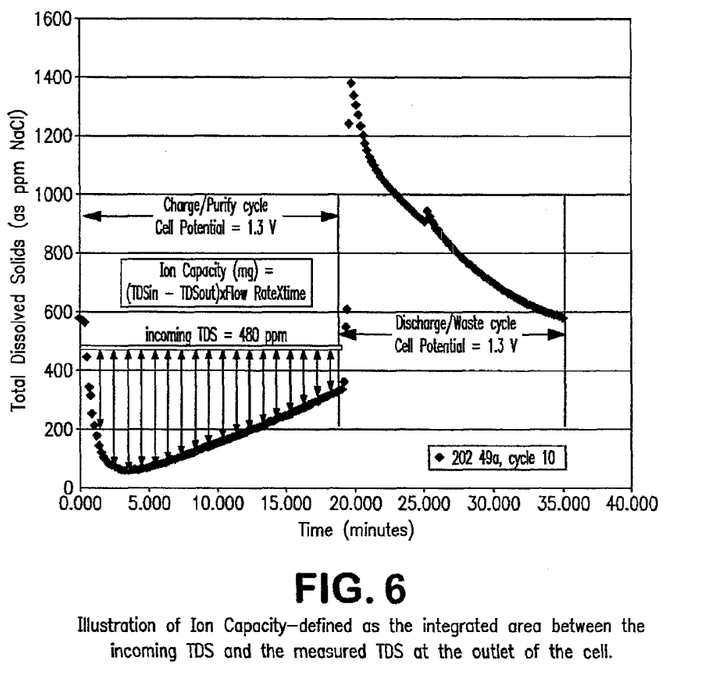
FIG. 6 is a graph of TDS vs time.

In some experiments it was considered useful to employ a Ag/AgCl reference electrode (see FIG. 5) (70) to determine how the potential split between the two electrodes. The position of the reference electrode is shown in FIG. 5. Positioned in the circular cavity (51) surrounding the cell components, the solution potential should be constant. The chloride activity of the test water was estimated to be 0.00356 M using Debye-Huckle approximations for the activity coefficient. From this activity, the potential of the reference electrode was determined to be 0.367V vs. the standard hydrogen electrode. Protocols could be programmed that enabled a short open circuit condition, or a so called current interrupt. This protocol enabled in-situ determination of the potential of each electrode, free of cell IR.

Electrodes

Activated Carbon Electrodes in thicknesses of 800 micron, were obtained from Japan Gore-Tex. These electrodes are marketed commercially for electrolytic double layer capacitor, and particularly for coin cell applications.

Membranes

Cation Membrane was GORE SELECT (GS018950-44us) produced by W.L. GORE & Associates, Inc. Anion membrane was FUMASEP FAB 30 um non-brominated (lot MI0507-140), obtained from FUMATECH GmbH.

Spacer

The spacer was a woven polyester screen, 0.004" thick, 180 threads per inch, PETENYL, obtained from Tenyl Tecidos Técnicos Ltda, Brazil.

Test Water

A test water made to simulate a "hard" tap water was formulated using the following recipe.

| | |
|---|---|
| Calcium chloride dehydrate (CaCl2•2H2O) | 293.6 mg/L |
| Sodium bicarbonate (NaHCO3) | 310.7 mg/L |
| Magnesium sulfate heptahydrate (MgSO4•7H2O) | 246.5 mg/L |

The resulting water had a total hardness of 300 mgCaCO3/L, calcium hardness of 200 mg/L, alkalinity 185 mg CaCO3/L and a pH of approximately 8.0.

Varying charge voltages and discharge voltages for Example 1 and Comparative Examples 1 and 2 were applied to the cell described herein. The results are tabulated below.

TABLE 1

| Run | Charge Potential (Volts) | Discharge Potential (Volts) | Hours until average TDS is 290 ppm | Hours until capacity is <50% of initial | AVG TDS (ppm) @ 24 hrs. | Capacity (1000 ppm*sec) @ 24 hrs |
|---|---|---|---|---|---|---|
| Comparative Example 1 | 1.3 | −1.3 | 55 | 56 | 167 | 994 |
| Example 1 | 1.0 | −1.0 | 255+ | 201 | 163 | 654 |
| Comparative Example 2 | 1.0 | −1.3 | 164 | 158 | 154 | 601 |

| Run | Charge Potential (Volts) | Discharge Potential (Volts) | AVG TDS (ppm) @ 10 hrs. | Capacity (1000 ppm*sec) @ 24 hrs |
|---|---|---|---|---|
| Comparative Example 1 | 1.3 | −1.3 | 129 | 79 |
| 202-96c | 1.0 | −1.0 | 281 | 37 |
| Comparative Example 2 | 1.0 | −1.3 | 202 | 63 |

Figure 7:
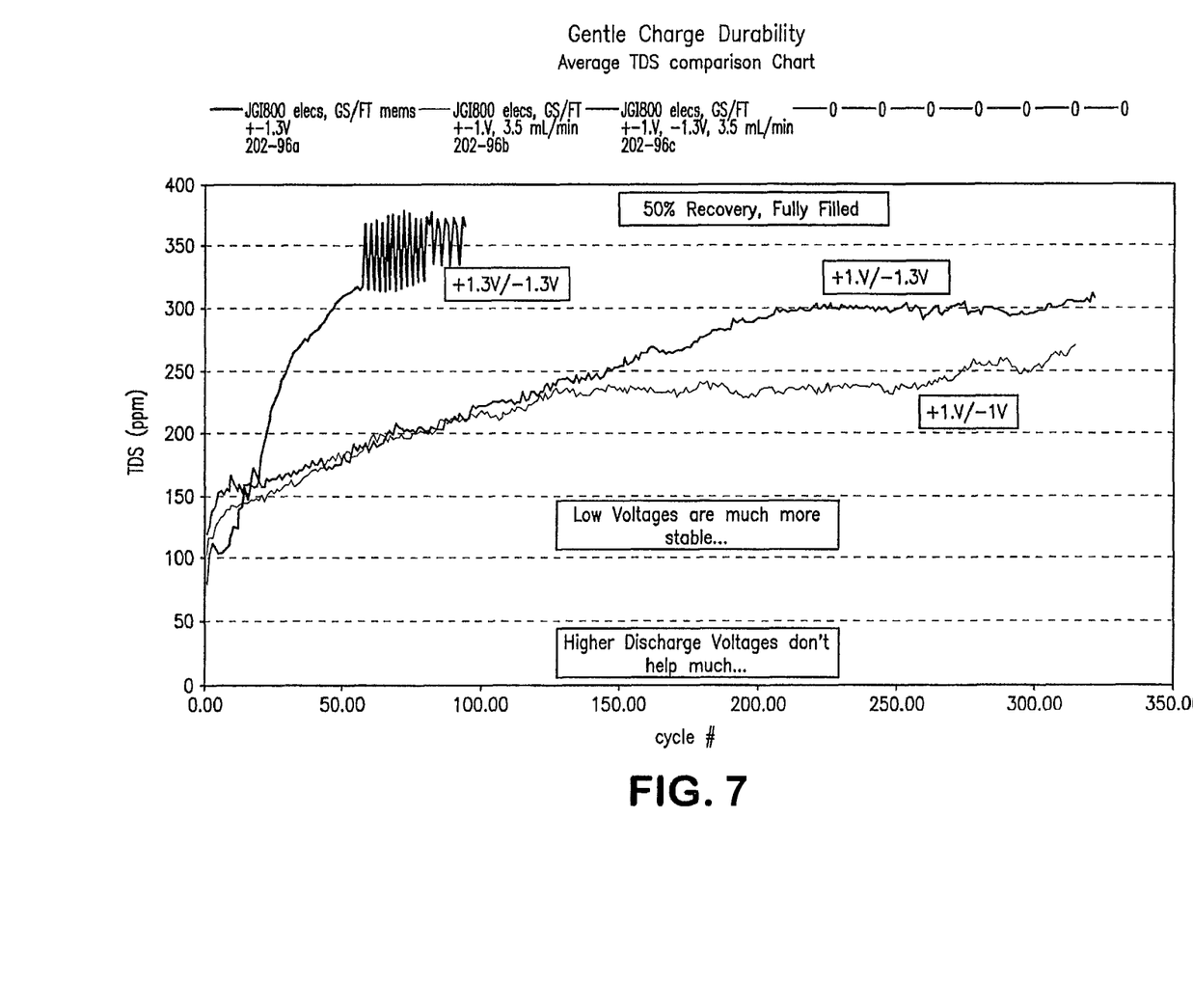
FIG. 7 is a graph of TDS vs cycle number.
Figure 8:
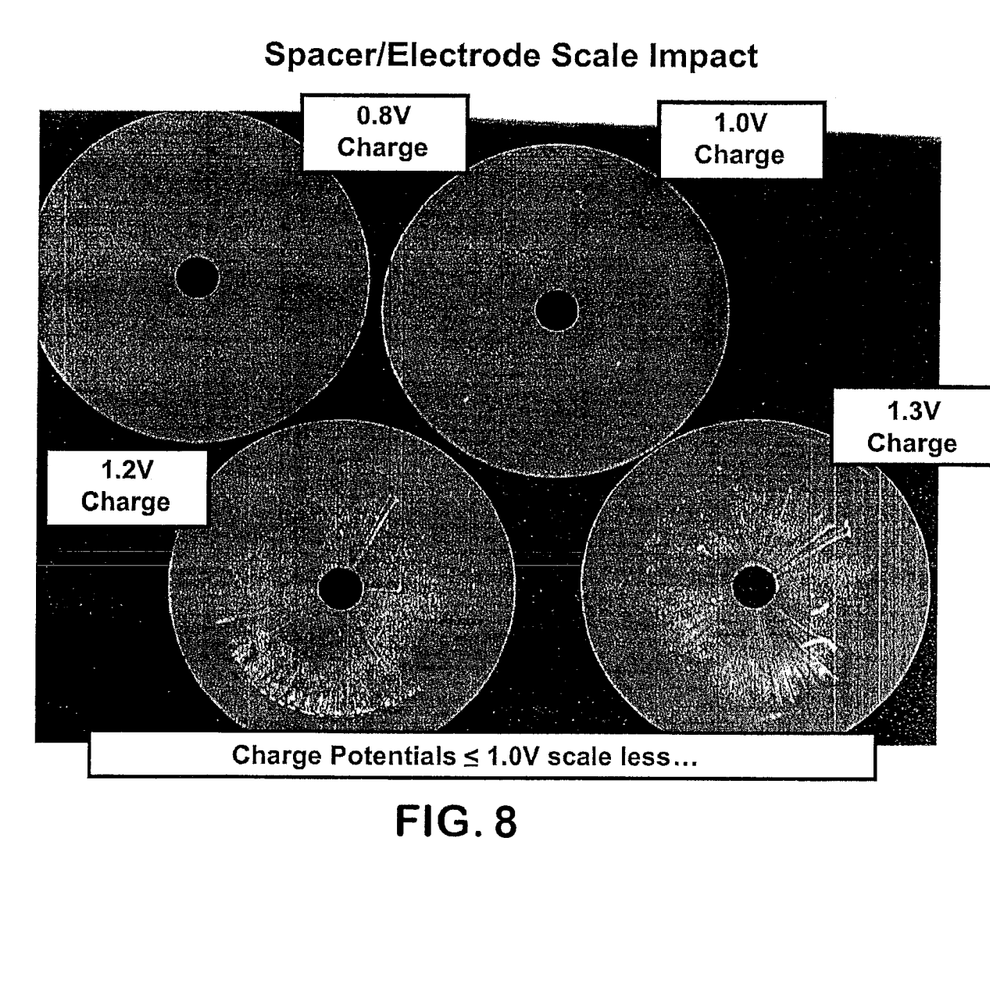
FIG. 8 is a photograph of cell components after use to show scale buildup.
Figure 9:
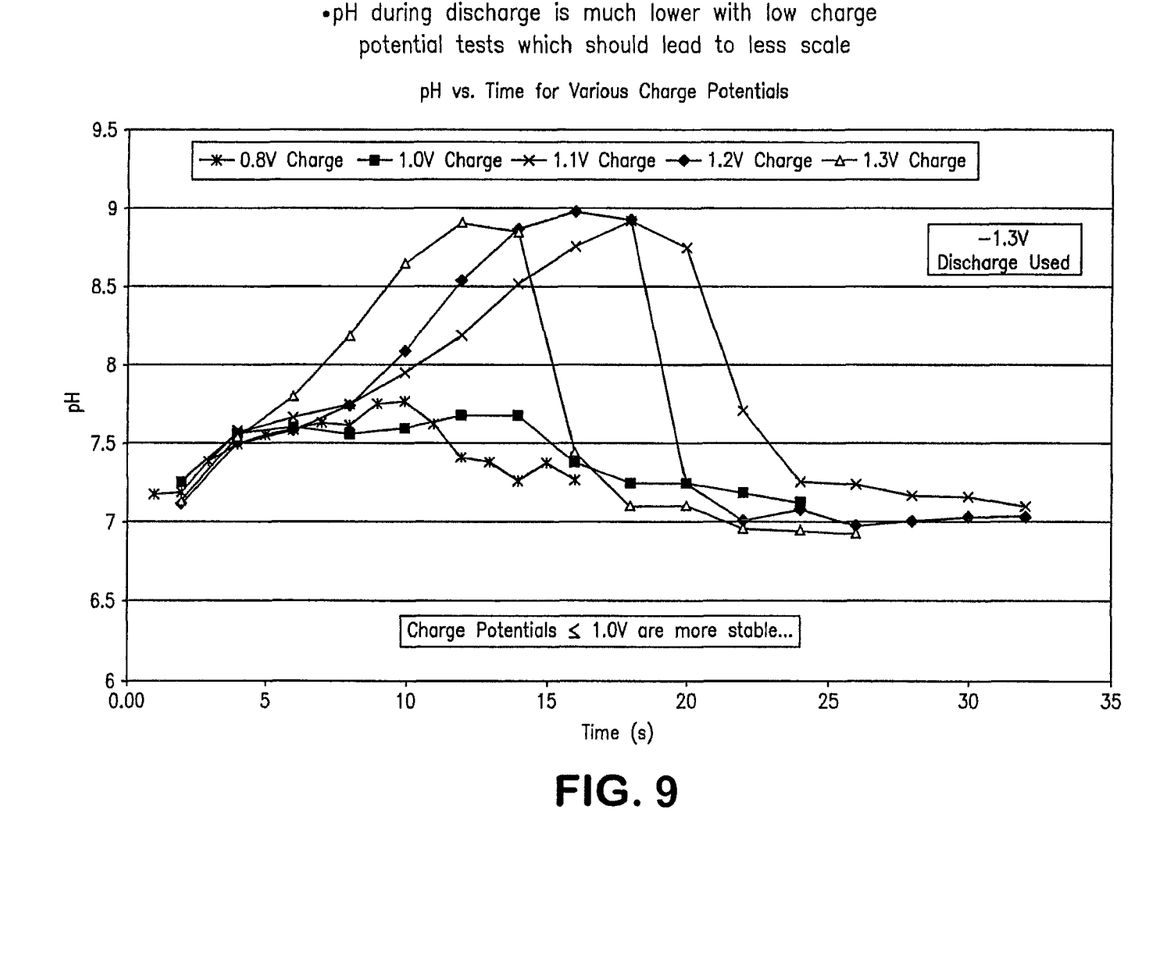
FIG. 9 is a pH curve.

A graph showing the durability of the various Example and Comparative Examples is shown in FIG. 7. FIG. 8 illustrates the improvements in scale buildup. The inventive Example 1 (using 1 V) and Example 2 (using 0.8 V) showed less scale buildup than Comparative Examples run using charge potentials greater than 1. FIG. 9 is a pH curve showing that the inventive Examples using lower charge potentials are more stable.

In conclusion, charge potential is critical with respect to the main degradation mechanisms in a CDI cell. Using a charge potential of 1 V or less may reduce performance in terms of TDS, but overall performance is more consistent, the pH curve is flatter, and most significantly, spacer scale is reduced.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method for durably softening water, the method comprising:
    collecting a stream of clean water at a flow rate of F1, while applying a charge voltage of between about 0.5V and about 1.0V between a cathode current collector and an anode current collector for a first period of time, T1, wherein a cell comprises the cathode current collector, a first electrode capable of adsorbing or absorbing ions, a cation selective membrane, a spacer, an ion selective membrane, a second electrode capable of adsorbing or absorbing ions, and the anode current collector; and
    collecting a stream of waste water at a second flow rate, F2, while applying a discharge voltage between about −1.5 and about −1.0 V between the cathode current collector and the anode current collector for a second period of time, T2, such that (T1)(F1)/[(T1)(F1)+(T2)(F2)] is greater than or equal to about 0.5, wherein the magnitude of the charge voltage is lower than the magnitude of the discharge voltage.

2. A method as defined in claim 1 wherein (T1)(F1)/[(T1)(F1)+(T2)(F2)] is greater than or equal to about 0.6.

3. A method as defined in claim 1 wherein (T1)(F1)/[(T1)(F1)+(T2)(F2)] is greater than or equal to about 0.7.

4. A method as defined in claim 1, comprising:
    collecting the stream of clean water at the flow rate of F1, while applying the charge voltage of between about 0.5V and about 1.0V between the cathode current collector and the anode current collector for the first period of time, T1, during a charge cycle;
    collecting the stream of waste water at the second flow rate, F2, while applying the discharge voltage between about −1.5 and about −1.0 V between the cathode current collector and the anode current collector for the second period of time, T2, during a discharge cycle,
    wherein a combination of the charge cycle and discharge cycle is performed sequentially a plurality of times and the magnitude of the charge voltage during each charge cycle of the plurality of charge cycles is lower than the magnitude of the discharge voltage during each discharge cycle of the plurality of discharge cycles.

5. A method for durably softening a water stream that has a pH of less than about 8, the method comprising:
    collecting a stream of clean water at a flow rate of F1, while applying a charge voltage of between about 0.5V and about 1.0V between a cathode current collector and an anode current collector for a first period of time, T1, wherein a cell comprises the cathode current collector, a first electrode capable of adsorbing or absorbing ions, a cation selective membrane, a spacer, an ion selective membrane, a second electrode capable of adsorbing or absorbing ions, and the anode current collector; and
    collecting a stream of waste water at a second flow rate, F2, while applying a discharge voltage between about −1.5 and about −1.0 V between the cathode current collector and the anode current collector for a second period of time, T2, such that the pH of the clean water is maintained below a value of about 8.5, wherein the magnitude of the charge voltage is lower than the magnitude of the discharge voltage.

6. A method as defined in claim 5 wherein the pH is maintained below a value of about 8.0.

7. A method as defined in claim 5 wherein (T1)(F1)/[(T1)(F1)+(T2)(F2)] is greater than or equal to about 0.5.

8. A method as defined in claim 5 wherein (T1)(F1)/[(T1)(F1)+(T2)(F2)] is greater than or equal to about 0.6.

9. A method as defined in claim 5 wherein (T1)(F1)/[(T1)(F1)+(T2)(F2)] is greater than or equal to about 0.7.

10. A method as defined in claim 5, comprising:
    collecting the stream of clean water at the flow rate of F1, while applying the charge voltage of between about 0.5V and about 1.0V between a cathode current collector and an anode current collector for the first period of time, T1, during a charge cycle;

collecting the stream of waste water at the second flow rate, F2, while applying the discharge voltage between about −1.5 and about −1.0 V between the cathode current collector and the anode current collector for the second period of time, T2, during a discharge cycle, wherein a combination of the charge cycle and discharge cycle is performed sequentially a plurality of times and the magnitude of the charge voltage during each charge cycle of the plurality of charge cycles is lower than the magnitude of the discharge voltage during each discharge cycle of the plurality of discharge cycles.

\* \* \* \* \*